United States Patent [19]

Mendelsohn

[11] 4,095,144
[45] June 13, 1978

[54] MASK-LESS SINGLE ELECTRON GUN, COLOR CRT

[75] Inventor: Charles Mendelsohn, Monsey, N.Y.

[73] Assignee: United Technologies Corporation, Hartford, Conn.

[21] Appl. No.: 751,560

[22] Filed: Dec. 17, 1976

[51] Int. Cl.$^2$ ............................................. H01J 29/80
[52] U.S. Cl. .................................. 315/375; 315/5.31; 313/470
[58] Field of Search ............... 315/372, 374, 375, 382, 315/31 R, 31 TV, 5.31, 5.34; 358/66, 71, 218; 313/455, 461, 470, 472

[56] References Cited

U.S. PATENT DOCUMENTS

| | | | |
|---|---|---|---|
| 2,619,608 | 11/1952 | Rajchman | 313/415 X |
| 2,962,623 | 11/1960 | Beintema | 313/397 |
| 4,023,063 | 5/1977 | King et al. | 313/470 X |

Primary Examiner—Maynard R. Wilbur
Assistant Examiner—T. M. Blum
Attorney, Agent, or Firm—Dominic J. Chiantera

[57] ABSTRACT

A color cathode ray tube (CRT) provides excitation of a plurality of noncontiguous picture elements disposed substantially in a matrix configuration of rows and columns on the inside surface of a video screen formation included within the tube, with a hollow electron beam provided by a modulatable, hollow beam electron gun assembly within the tube, each picture element including a plurality of different color phosphors deposited in a determined concentric geometric pattern, the screen formation further including a high work function dielectric material disposed interposingly with the picture elements of the matrix configuration for providing a negative electrostatic field gradient in a direction opposite to that of the incident hollow electron beam horizontally deflected across the screen by a deflection circuit, to cause registration of the beam with each successive picture element and to cause, in combination with the deflection circuit, the beam to step from the center of one picture element to the center of a next adjacent picture element is a horizontal row, the full hollow electron beam current being presented directly to the video screen without restriction through a post deflection apparatus, the electron gun providing the hollow beam with an instantaneous average diameter in dependence on the diameter of the instant, excited phosphor.

19 Claims, 12 Drawing Figures

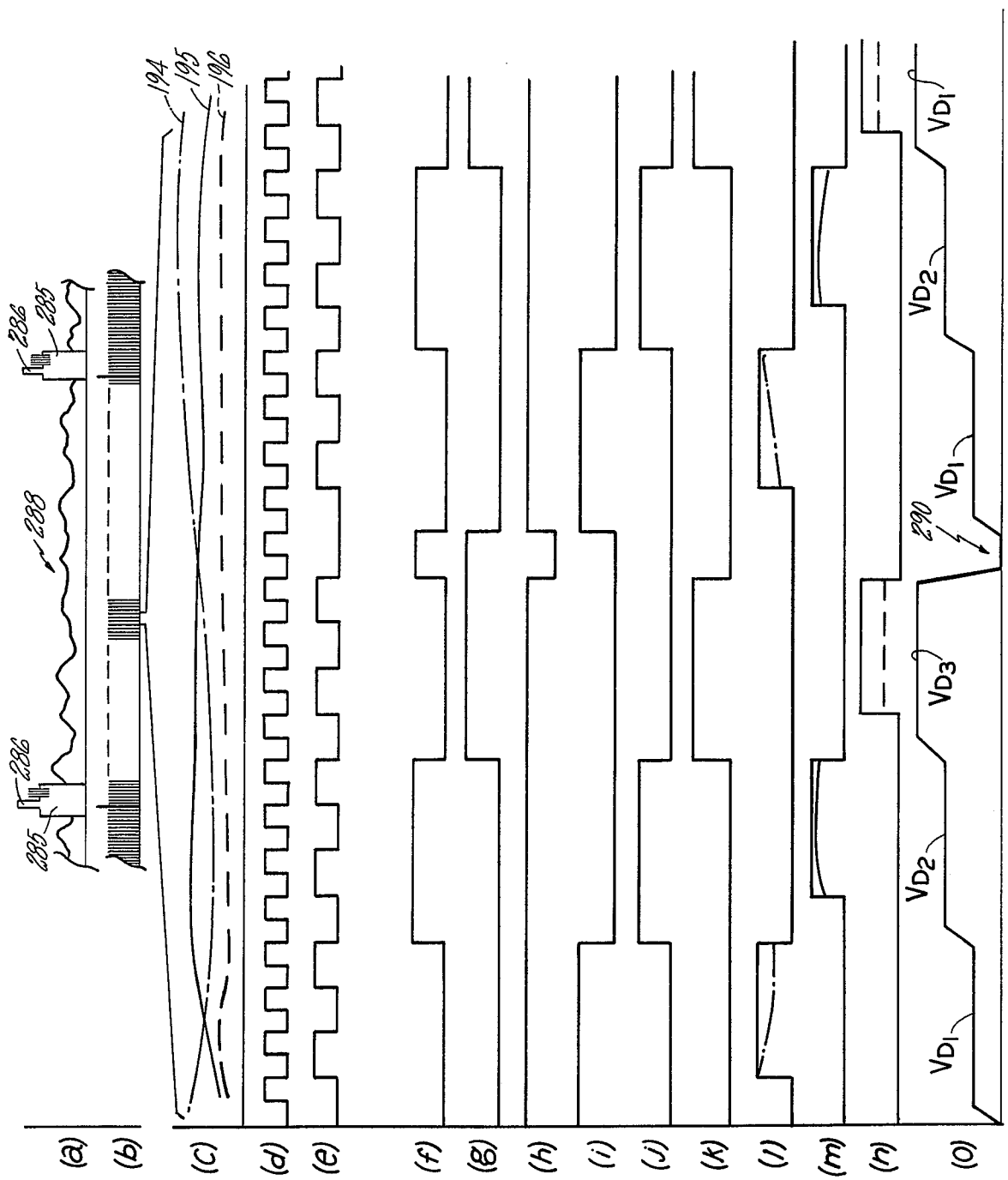

MASK-LESS SINGLE ELECTRON GUN, COLOR CRT

CROSS REFERENCE TO RELATED APPLICATION

A portion of the subject matter hereof is also disclosed, and some of it is claimed, in a commonly owned copending application entitled MODULATABLE, HOLLOW BEAM ELECTRON GUN, Ser. No. 751,561, filed on even date herewith by Charles Mendelsohn et al.

BACKGROUND OF THE INVENTION

1. Field of Invention

This invention relates to color cathode ray tubes, and more particularly to color cathode ray tubes for providing excitation of a plurality of color phosphor groups on a video screen with a single electron gun whose electron beam is maintained in phosphor registration without the use of any post deflection apparatus.

2. Description of the Prior Art

One of the major problems in providing a high color fidelity video display is ensuring the registration of an exciting electron beam with each of the plurality of color phosphors on the video screen of the CRT. At the present time there are two electron beam positioning methods used to provide color registration, namely; the use of a three electron gun assembly in combination with a high precision shadow mask, and a single, or multiple, electron gun assembly with an electrically biased matrix of grid wires disposed in close proximity to the video screen. The shadow mask and grid matrix assemblies, generically called post deflection apparatus, are high cost items requiring precision tolerances in manufacture, and complicated electronic circuitry and alignment testing procedures to guarantee precise color registration, or color convergence, of the electron beam on the individual color phosphors deposited across the CRT screen surface. Furthermore, these post deflection apparatus disposed within the CRT between the gun assemblies and the video screen, are in the direct path of the deflected electron beam causing attenuation of the electron beam current density by the solid portions of the assemblies such that only twenty to thirty-five percent of the emitted beam current impinges the screen and is actually used for phosphor excitation. As a result, higher operating voltage potentials than that used in black and white CRT's are used to compensate for the loss and provide sufficient current excitation of the phosphors. This higher power requirement for color CRT's results in the use of a higher energy beam requiring higher power beam deflection systems and increased x-ray emission from the CRT, which further results in excessive power consumption and potential health hazards due to excessive radiation emission. Alternatively, a reduction of the operating voltage potentials to levels comparable with that used in balck and white CRT's, results in an unacceptable reduction in video display brilliance.

SUMMARY OF THE INVENTION

An object of the present invention is to provide a color cathode ray tube (CRT) having a single electron gun apparatus for successively presenting the full emitted current of a single electron beam, in registration, to each of a plurality of picture elements disposed on a video screen therein without the use of a post deflection apparatus such as a precision shadow mask, or electron grid assembly.

According to the present invention, video signals, horizonatla and vertical deflection signals, anode voltage signals and electron beam modulation signals are presented to a mask-less, single electron gun color CRT which includes: a vacuum glass envelope having a hollow funnel portion with a large diameter flared end enclosed in a vacuum sealing relationship by a faceplate portion, having a transparent major surface, and a small diameter tapered end disposed in a vacuum sealing relationship with a hollow neck portion extending rearward from the funnel portion along a central longitudinal axis thereof; a modulatable hollow beam electron gun assembly, disposed inside the neck portion and connected for response to the source of video, the source of anode voltage signals, and the source of beam modulation signals, for providing a hollow electron beam having a determined instantaneous inner and outer diameter in dependence on the magnitude of the beam modulation signals, and an instantaneous current density in dependence on the magnitude of the video signals, presented thereto, the beam axis being coincident with the longitudinal axis of the neck portion; beam deflection apparatus disposed on the outside surface of the vacuum glass envelope at the junction of the neck and funnel portions and circumscribing the trajectory of the electron beam, for providing deflection of the beam across the transparent major surface in each of two orthogonal directions in response to the beam deflection signals; and a video screen formation disposed on the inside surface of the transparent major surface of the faceplate portion and including a plurality of noncontiguous picture elements disposed substantially in a matrix configuration of rows and columns, each picture element having a determined surface area boundary and including a plurality of different color phosphors deposited in a determined concentric pattern within the surface area boundary, the video screen formation further including a high work function, dielectric material, such as boron nitride, which is inorganic, thermally refractive, and electrically insulative, and which has a second crossover voltage potential value that lowers its secondary electron emission characteristic to less than unity for each bombarding primary electron, and which is disposed interposingly with the plurality of the picture elements on the transparent major surface, for providing an electrostatic field which is negative with respect to the anode voltage signal and which has an intensity gradient in a direction opposite to the trajectory of the incident hollow electron beam to provide, in combination with the beam deflection apparatus, registration of the incident hollow beam on each picture element successively, for a determined time interval, and stepping of the beam from the center of one picture element to the center of a next adjacent picture element in each row at the end of the determined time interval.

In further accord with the present invention, the different color phosphors are disposed in a concentric pattern having a solid center portion of a first color, a first ring circumscribing the solid center and comprising a different color phosphor, and a second ring circumscribing both the solid center and first ring and including a third color phosphor, and the electron gun provides a sequence of hollow beam determined instantaneous inner and outer diameters during registration of the beam on each picture element, each inner and outer beam diameter being dependent on the diameter of the instant excited phosphor within the respective picture elements. In still further accord with the present invention, the surface area of each picture element is covered by an aluminum coating of determined thickness, and each picture element aluminum coating is connected to the source of the anode voltage signal.

By providing full beam current to the video screen without loss through a post deflection apparatus, the color cathode ray tube of the present invention provides a video display having a brilliance level comparable to that provided by a prior art color CRT, but with reduced operating power levels. As a result the CRT provides energy conservation and derivatively, a reduction in health hazards resulting from reduced x-ray emission. The elimination of a required post deflection apparatus for providing registration of the electron beam on the phosphors of the video screen results in a reduction in CRT fabrication time, and cost, in addition to the elimination of the complicated electronic circuitry and alignment test procedures for controlling color purity and convergence. In addition, the hollow electron beam: provides less power dissipation within the CRT; requires less beam deflection power; and maintains its beam shape more accurately over the full deflection angle due to reduced coulomb repulsion within the beam cross section. Also, the brilliance level of the video display may be adjusted for different operating environments, by adjusting the dimensions of the concentric phosphors to provide an increase, or decrease, in the circular mil area of the exposed phosphor in dependence on its photon efficiency.

These and other objects, features and advantages of the present invention will become more apparent in the light of the following detailed description of the preferred embodiment thereof, as illustrated in the accompanying drawing.

BRIEF DESCRIPTION OF THE DRAWING

FIG. 11 is an illustration of the operating wave forms of a portion of the embodiment of FIG. 9; and FIG. 12 is a sectioned view of one element of the electron gun assembly of FIG. 7.

DESCRIPTION OF THE PREFERRED EMBODIMENT

Figure 1:
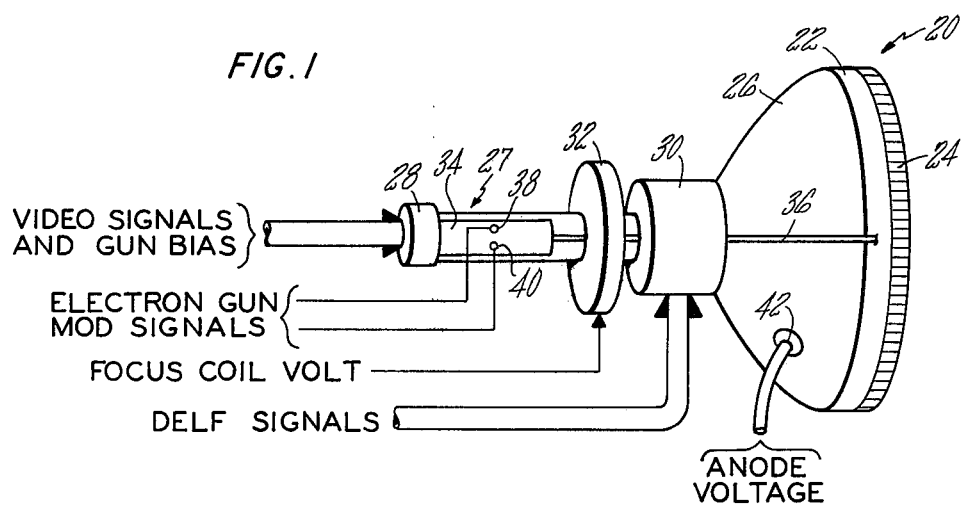
FIG. 1 is an illustration of a mask-less, single electron gun color CRT according to the present invention.

Referring to FIG. 1, an illustrative embodiment of a mask-less, single electron gun, color cathode ray tube (CRT) 20 includes a faceplate portion 22 having a video screen formation 24, a funnel portion 26 having a larger diameter flared end in register with the faceplate 22 and a small diamter tapered end connected with a cylindrical neck portion 27 extending from the tapered portion of the funnel assembly, and an electrical connector, all of which are joined in a vacuum seal relationship. An electron beam deflection assembly 30 is disposed on the outside surface of the neck portion at the junction of the neck and funnel portions, and a focusing assembly 32 is disposed on the outside of the neck portion immediately adjacent to the deflection assembly. In a preferred embodiment both the deflection assembly and the focusing assembly are of the electromagnetic type, however, each may be electrostatic assemblies. A modulatable, hollow beam electron gun assembly 34, identical to that disclosed in detail in my hereinbefore referenced, copending application, the detailed description of which is expressly incorporated by reference in the present application, is disposed inside the neck portion 27 between the connector 28 and the focusing assembly 32. As described in the referenced copending application, the electron gun 34 provides a hollow electron beam 36, the current density of which is dependent on the magnitude of video signals and bias voltage signals presented through the connector 28 to the cathode and control gird assemblies thereof, and the average diameter of which is provided in dependence on modulation signals presented through terminals 38, 40 to an electrostatic beam modulator assembly included therein.

The CRT 20 also includes an anode voltage connector 42 disposed through the wall of the funnel portion 26, the connector being in electrical contact with a conductive coating, such as aquadag, disposed on the inside wall of the funnel and neck portions 26, 27, in a similar manner to a prior art CRT. With the exception of the video screen formation 24 and modulatable, hollow beam electron gun assembly 34, and the absence of any post deflection apparatus such as a precision shadow mask, or electron grid, as used in the three gun triad and linatron type color CRT, the CRT 20 incorporates substantially the same mechanical structure found in a prior art CRT. Similarly, although not shown, the CRT 20 may further include a Mu metal shield around the funnel and neck portions to limit EMI emissions from the tube which may cause interference for the adjacent electrical equipment and to minimize the effects of external electrostatic or electromagnetic fields on the beam itself.

As stated hereinbefore the CRT 20 of the present invention differs from a prior art color CRT through incorporation of the video screen formation 24 which does not require a post deflection apparatus for registration of the electron beam 36 on the various color phosphor groupings disposed thereon. As described hereinafter, the screen formation 24 presents a self-generated, surface electrostatic field to the beam 24 as it is deflected across the screen which causes beam convergance and alignment on a plurality of phosphors comprising each of a plurality of picture elements disposed on the screen surface. This surface electrostatic field provides an effective "step function" to the electron beam incident at the surface, causing the beam to step, or snap, from one picture element to a next adjacent picture element in a horizontal line during the horizontal deflection of the beam. With the elimination of the post deflection apparatus, the entire emitted beam current is incident on each picture element instead of less than fifty percent of beam current as occurs in shadow mask tubes due to current loss in striking the mask. As a result a more brilliant viedo display is provided for the same CRT power levels used in prior art tubes, or conversely, a video image is provided at a brilliance level comparable to the prior art tubes, but at substantially reduced power levels. The former feature, i.e. greater video brilliance is important for aircraft video displays where high ambient light intensity levels (sunlight) causes a "washout" of the image. The latter feature is important in consumer video displays for providing comparable performance at energy saving power levels, in addition to providing a reduction of x-ray emission, and a consequent increase in human safety, through reduction in the required high anode voltage requirement.

Figure 2:
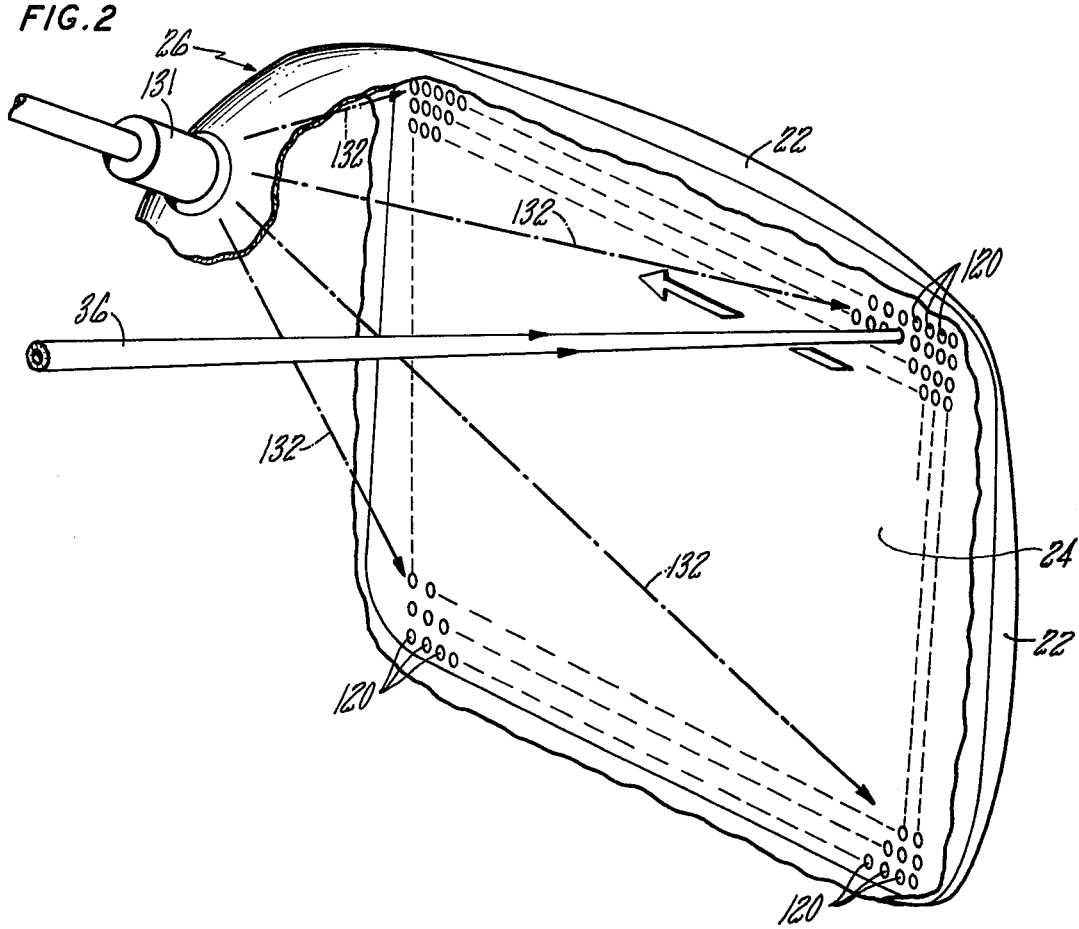
FIG. 2 is a cutaway, perspective illustration of a portion of the CRT of FIG. 1.

Referring now to FIG. 2, in a perspective cutaway view of the funnel portion 26 which permits a view of the surface of the video screen formation 24, the screen formation includes a plurality of picture elements 120 disposed substantially in a matrix configuration of rows and columns. Each of the elemnts 120 includes a plurality of concentric phosphor rings, as described in detail with respect to FIG. 3, and the number of rows and elements disposed in each row is dependent on the required video color fidelity and the surface area of the CRT video screen. The total array of picture elements 120 is in accordance with the standard color television raster pattern defined by NTSC standards and the screen geometry may be similar to known CRT screen assemblies, such as a width to height aspect ratio of 4/3.

Figure 3:
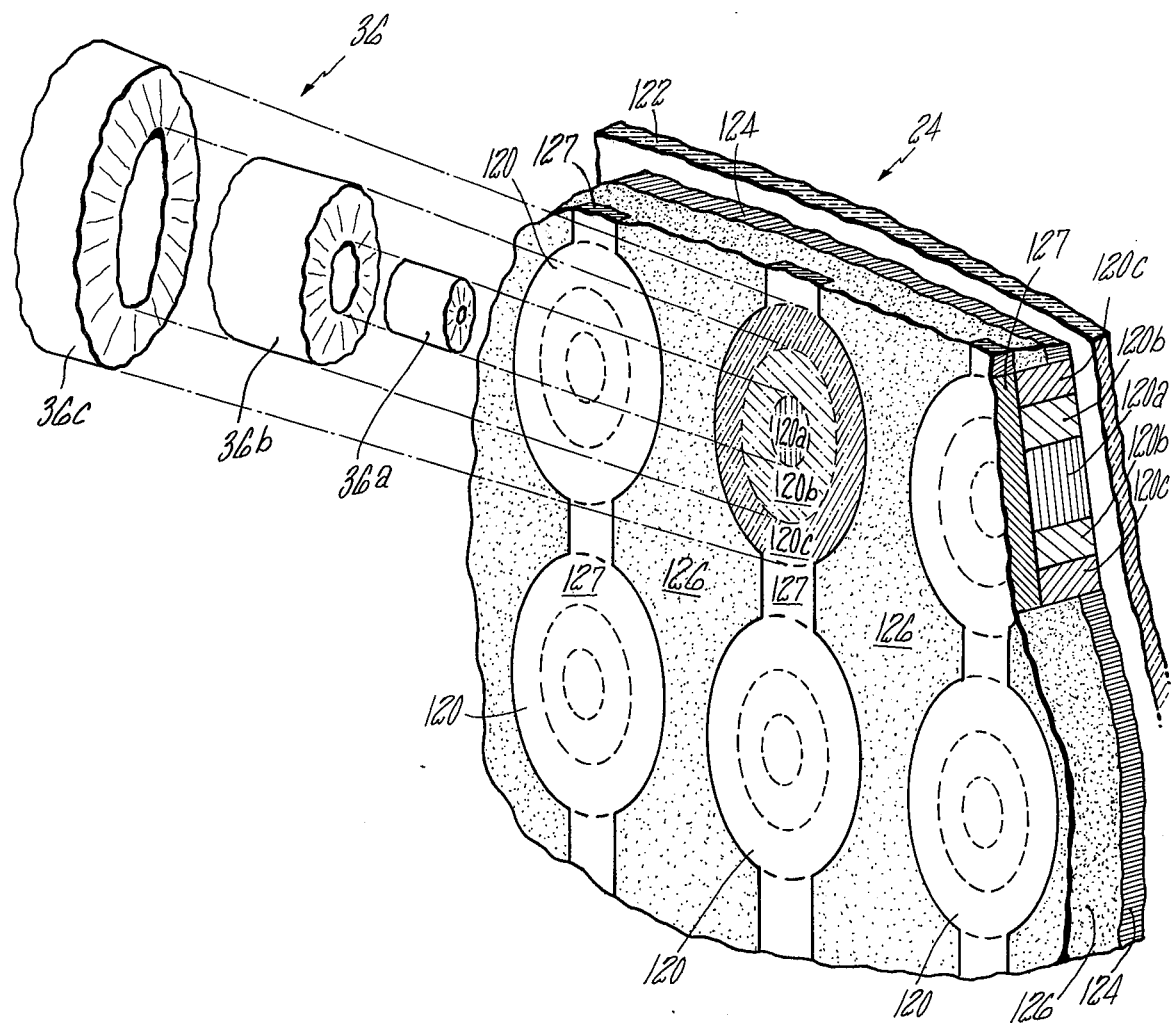
FIG. 3 is a sectioned, perspective view of one embodiment of the video screen formation of the CRT of FIG. 1.

As shown in a cutaway view of a portion of the screen formation 24 in FIG. 3, the picture elements 120 are noncontiguous to each other, but are relatively spaced at a determined distance. The video screen formation 24 is disposed on the inside surface of a glass wall 122 which comprises the viewing surface of the faceplate assembly 22. Each of the plurality of picture elements 120 includes three concentric areas $120_{a, b, c}$, each comprising a different one of the three basic color phosphor GREEN, RED and BLUE. The concentric rings may be of any determined geometry, i.e. circular, elliptical, a combination of each, in dependence on the geometry of the hollow beam 36 (FIG. 1) incident at the screen surface. The relative area of each of the concentric phosphors $120_{a-c}$ is determined by the photon efficiency of the color phosphor disposed within the area. Of the three color producing phosphors GREEN is the most efficient photon radiator under electron bombardment and is the most easily seen by the human eye, such that it is disposed within the innermost, solid center $120_a$ which has the smallest area. RED is the next most efficient photon emitter of the three and is disposed within the first ring $120_b$ around the solid center $120_a$. Finally the BLUE phosphor, the weakest color radiator of the three, is disposed in the outermost ring $120_c$ which has the largest circular-mil area. The circular-mil area of each concentric element may be adjusted as desired to provide the required, radiated color balance in any given CRT by the proper selection of area diameters.

The three color phosphors are deposited directly on the glass wall 122 in a photographic process known in the art, which requires the use of mask assemblies to restrict the deposited phosphor to the corresponding one of the concentric areas. The interconnecting surface area of the glass 122, which is free from the phosphor deposits, is coated with an opaque, carbonous material 124, such as graphite which provides a light absorbing region around each element 120 when viewed from the outside viewing surface to provide high contrast. A "high work function" dielectric material 126 which is an inorganic, thermally refractive, electrical insulator, having a second crossover voltage potential value, or "limiting potential", that lowers its secondary emission characteristic to less than unity for every bombarding primary electron, such as boron nitride, is deposited over the carbonous material 124. The high work function dielectric material provides a nonfluorescent insulator which is essentially homogeneous throughout the surface area of the screen formation not covered by the picture elements, and is contiguous with each of the picture elements at the boundary of the outer ring $120_c$.

The surface area of each of the plurality of picture elements 120, and an interconnecting strip region between the plurality of elements 120 in each of the columns of the screen formation, are covered by an evaporated aluminum coating 127, which has a thickness on the order of 2000A, and which completely covers the concentric areas in each element. The layer of evaporated aluminum is electrically connected to the aquadag coating deposited on the inside wall surface of the faceplate assembly 22, and thereby, to the anode voltage source $(V_A)$ of the CRT 20. The aluminized coating is deposited on the surface of the screen 24 through a depositing technique known in the art, using a mask which prohibits aluminizing the interposed areas between the elements except for the interconnecting strip portion between column elements. As may be known, the evaporated aluminum coating on the surface of the picture elements 120 provides both an ion shield, preventing ions from penetrating the phosphor composition and causing burn out of the phosphor at the center of the screen, and a return current path to the anode voltage source for secondary electrons emitted from the surface on impact of the electron beam. The 2000 A coating thickness permits the electrons in the beam having a sufficiently high energy to pass through the coating, the typical minimum beam energy being 10 microamps at 20 Kv. In addition the aluminum coating provides a reflective surface for the back scattered light from the excited phosphors, enhancing the brightness of the phosphors.

The typical thickness of the deposited color phosphor crystals is on the order of 4 microns, and in the CRT 20 a total phosphor coating thickness on the order of 10 to 12 microns is provided. A corresponding coating thickness is provided for the high work function dielectric material 126 which has a comparable individual crystal thickness on the order of 4 microns. It should be noted that the black matrix material 124 may be of a small layer thickness since the high work function material 126 is opaque, and may include a black composition coloring agent to provide the same color contrast between picture elements when viewed from the outside of the screen as that presently provided by prior art "black matrix" color CRT's.

In the operation of the video screen formation, the electron beam is deflected across the screen by the deflection coil 30 and the electrons of the beam 36 penetrate the aluminum coating 127 and cause excitation of the corresponding concentric phosphor in dependence on the instantaneous average diameter value of a respective one of the beam diameters 36a through 36c. Any secondary electrons emitted from the phosphor after impact of the primary electrons are reflected back to the aluminum coating 127 and drained off to the anode power supply. During deflection of the electron beam across the high work function material, the electrons in the beam similarly penetrate through the surface crystals of the high work function material and are trapped in the lattice structure of the material. The electrons in successive raster sweeps of the beam impinge on the surface and build up a surface charge which accumulates to the point where equilibrium with the charge leakage to the aluminum coating exists, at which time the material is saturated with a high negative charge. The surface of the material emits secondary electrons under the bombardment of the beam, which fall back to the surface and are not drained off to the anode source. The cumulative result is the creation of a high negative electric field gradient, emanating from the surface of the high work function material in a direction opposite to that of the electron beam, which surrounds the individual picture elements except for the interconnecting, aluminized strips between the plurality of elements in each column. As a result of the negative electric field gradient, the electron beam is repelled from the surface areas coated with the high work function material. Therefore, as the electron beam 36 is horizontally deflected across the surface of the screen 24, from right to left (FIG. 2) it alternates scucessively between an aluminized picture elemtn area, through a high negative electric field gradient area, to the next adjacent picutre element in the line. That region of the material 126 which is contiguous to the aluminized surface of the elements 120 is affected by some degree of electron leakage, such that the magnitude of the electric field gradient in those contiguous areas will be of a lower value than that portion which is further removed.

Figure 4:
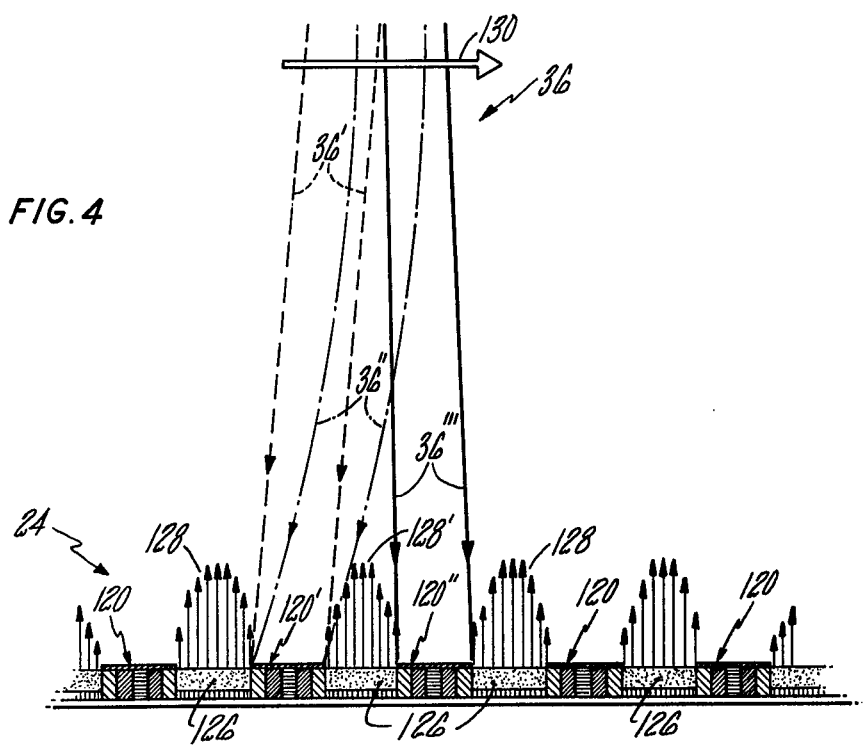
FIG. 4 is a sectioned view illustrative of the operation of the embodiment of FIG. 3.

Referring now to FIG. 4, in a sectional view of a portion of the video screen formation 24, the negative electrostatic field provided by the high work function material 126 is shown by the directional vectors 128, as emanating from the surface of the material 126 in an opposite polarity direction to the incoming electron beam 36. In operation, as the electron beam 36 is deflected across each of the plurality of horizontal lines, it alternates between the aluminized anode potential surface area of the picture elements 120 where the electrons penetrate through the 2000 aluminum coating to the selected one of the corresponding phosphor concentric rings, and then across the high negative field gradient provided by the work function material 124. Assume that at an instantaneous position, the electron beam 36' is incident on a given one of the picutre elements 120'. The linear horizontal sweep deflection signal presented to the yoke 30 causes the beam to traverse a path 130 across the screen formation from right to left, however, the electrons adjacent to the screen surface are repelled by the high negative field gradient 128' causing the electron beam to become curved, as shown in phantom by the beam 36". The negative field 128' causes a momentary delay in the deflection of that portion of the electron beam incident on the screen surface picture element 120' until the electromagnetic field of the horizontal deflection field overcomes the local negative field force 128' and flips the beam onto the next picture element 120". As a result, the deflection of the electron beam across the surface of the screen formation 24 appears as a step function, i.e. the electron beam increments across each horizontal line, snapping from the center of one element to the center of the next.

In the area between each picture element in each of the horizontal lines of the raster pattern, the work function material is homogeneous, and accordingly the negative electrostatic field density provided by the work material is similarly homogeneous. The intensity of the electric field gradient is at a minimum along the area where the material 126 and the picture elements 120 are contiguous since the affects of surface leakage cause a reduction in the electric field intensity, as shown generally by the slope of the vectors 128 in the regions adjacent and contiguous to the picture elements 120. In essence, the electric field gradient provides an "electrostatic shadow mask" for steering the electron beam incident at the surface of screen, onto the surface area of successive picture elements in a horizontal line during the horizontal deflection of the beam. The higher intensity portion of the electric field, in the center of the high work function material, cause the beam to step from one element to the next succeeding element, while the lower intensity electric field contiguous with the circumference, or perimeter, of the picture element, maintains the electron beam in register with the picture element surface during modulation of the hollow electron beam diameter. As described in detail hereinafter, the electron beam is sequentially modulated in a determined order through the different diameter values of each of the concentric phosphor areas in each element, to provide sequential color excitation of the individual phosphors, while the current density of the beam is simultaneously modulated in dependence on the luminance information of the received video signal to provide the video brightness in the displayed information.

In a preferred embodiment of the CRT 20, the range of current density of the electron beam will be on the order of 100 to 200 microamps, with an accelerating anode potential value on the order of 20 kilovolts. The beam current density is sufficient to maintain the electron saturation of the high work function material 126, however, if the combined effects of surface current leakage from the high work function material to the picture element aluminum surface and the scattering of electrons during secondary electron emission from the high work function material surface to the picture element surface, cause an unacceptable attenuation in the electric field intensity beyond that which the electron beam current itself is capable of correcting, the loss of surface electrons on the material 126, may be compensated through the use of a separate electron source such as a "flood gun" assembly, of the type used in a storage type CRT known in the art for maintaining a video image on the screen. Referring to FIG. 2, a flood gun 131 is mounted through an aperture in the surface of the funnel portion 26 of the CRT 20. The flood gun provides a low current density, low acceleration, electron emission which impinges the surface area of the screen formation in the form of an electron spray which is continuous during the CRT operation. The typical current density is on the order of 5 microamps. The flood gun assembly may include a solid cathode emitter and a single accelerating anode to provide an acceleration of the electrons emitted from the flood gun which is sufficient to overcome the electrostatic anode field generated by the aquadag coating deposited on the inside surface of the funnel portion 26, which would otherwise disperse the flood gun beam to the wall. In this manner, the high work function material 124 is constantly replenished with electrons which, due to the low beam current, provide little secondary electron emission. As a result, the electric field intensity is maintained at a relatively constant magnitude independent of the electron beam sweep.

Figure 5:
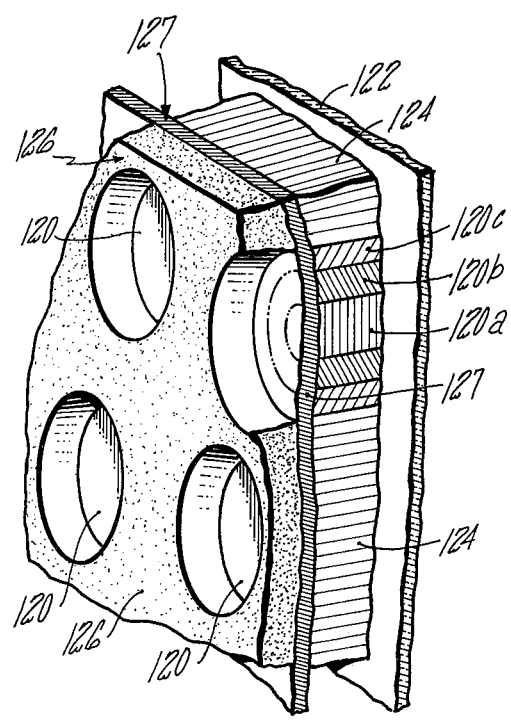
FIG. 5 is a sectioned, perspective view of an alternative embodiment to that shown in FIG. 3.
Figure 6:
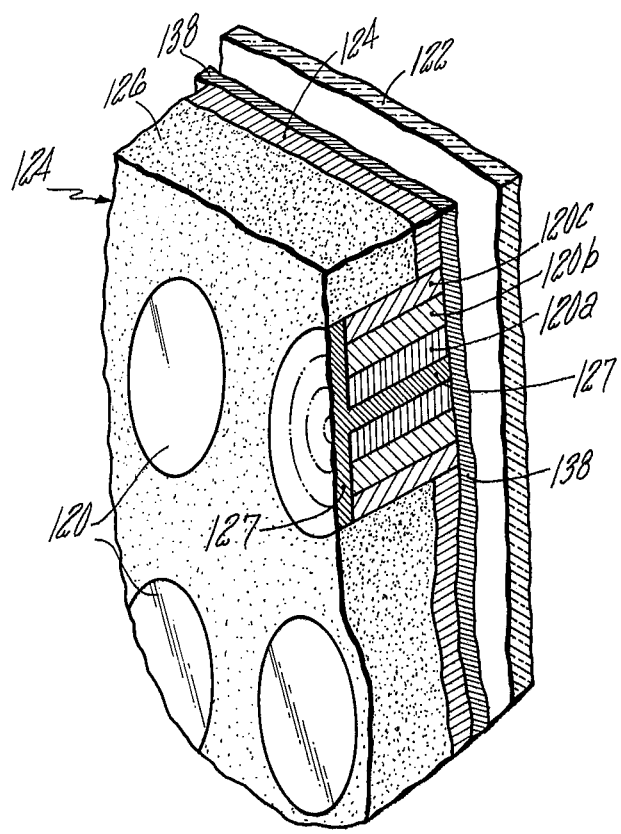
FIG. 6 is a sectioned, perspective view of still another alternative embodiment to that shown in FIG. 3.

The video screen formation 24 illustrated in FIG. 3 represents one embodiment of the screen with regard to the relative deposition of the elements of the formation, i.e. the phosphor concentric groups of each element, the high work function material 126, and the aluminum coating 127. Alternative embodiments of the screen formation may be provided, such as that shown in FIG. 5 wherein the phosphor deposits $120_a$ through $120_c$ are first deposited on the glass plate 122 as in the embodiment of FIG. 3. The composition of opaque, carbonous material 124 is then deposited on the glass surface 122 in the regions not covered by the concentric phosphor elements 120. The coating thickness of both the phosphor groups and the carbonous material is essentially equal. The aluminum coating 127 is then deposited across the entire surface of the screen formation, i.e. both phosphors and opaque material surface, providing the aluminum with a greatly increased surface area to which it may adhere, and substantially increasing the adhesion strength. The high work function material 126 is deposited in suitable thickness on top of the aluminum coating except in the areas of the picture elements which may be masked off. A still further embodiment of a video screen formation is shown in FIG. 6 where the screen formation includes a first layer of tin oxide 138 deposited on the inside surface of the glass 122. The tin oxide is deposited throughout the entire inside surface of the faceplate assembly 22 to provide electrical contact between the tin oxide and the aquadag coating to which the anode voltage is applied. The tin oxide is transparent to permit light emission from the excited phosphors, and being electrically conductive, is at the anode potential of the CRT. The phosphor colors $120_a$ through $120_b$ are deposited in substantially the same manner as in the embodiments of FIGS. 3, 5 except that the phosphor group $120_a$ (the innermost phosphor group) has a hollow, concentric aperture extending through the phosphor layers to the tin oxide coating. The carbonous, black matrix material 136 is deposited on the remaining surface area of the tin oxide 138, and the high work function material 126 is deposited on the matrix material 136.

Figure 7:
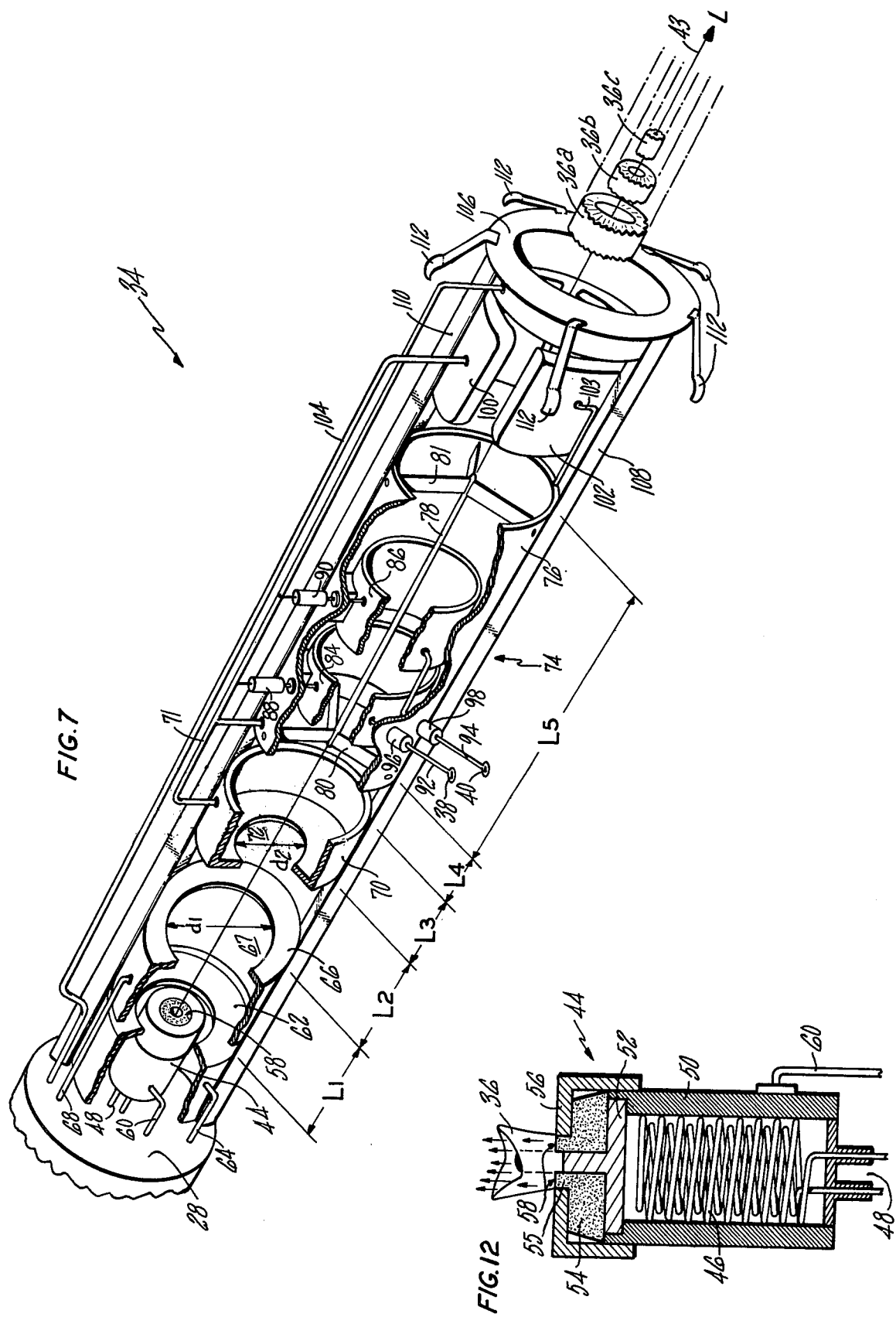
FIG. 7 is a cutaway, perspective view of a modulatable, hollow beam electron gun assembly, which is disclosed in detail and claimed in the hereinbefore referenced copending application, and which may be used in the embodiment of FIG. 1.
Figure 8:
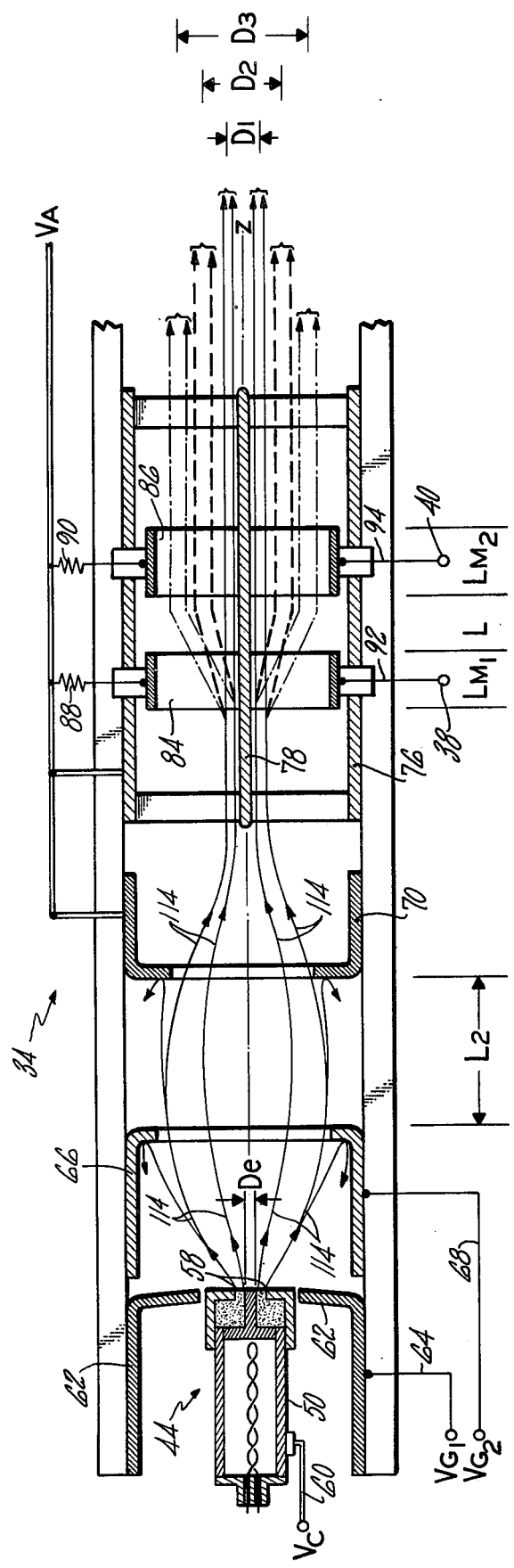
FIG. 8 is a sectioned view of the electron gun assembly of FIG. 7.

The mask-less, single electron gun color CRT of the present invention is capable of being interfaced with any of the color television receivers presently known in the art. This includes commercial television receivers receiving transmitted video signal information, and closed circuit television receivers such as aircraft video displays. As described in detail hereinafter, the modulatable, hollow beam electron gun 34, such as that disclosed in my hereinbefore referenced, copending application and illustrated for convenience of reference in the perspective view of FIG. 7 and sectional view of FIG. 8, provides sequential modulation of the hollow electron beam diameter to provide, in sequence, three beam diameter values ($D_1$, $D_2$, $D_3$), one at a time and one for each of the three concentric phosphors in each picture element. Each of the three diameter values are provided for a finite time interval sufficient to cause excitation of the corresponding one of the three phosphors at a current density in dependence on the instantaneous magnitude of a luminance video signal presented to the cathode assembly. Furthermore, each of the three finite time intervals are separated by an interium time interval in which the beam current density is reduced below the excitation level to prevent concurrent excitation of adjacent concentric phosphors during the change in beam diameter which would otherwise result in loss of color fidelity.

Figure 9:
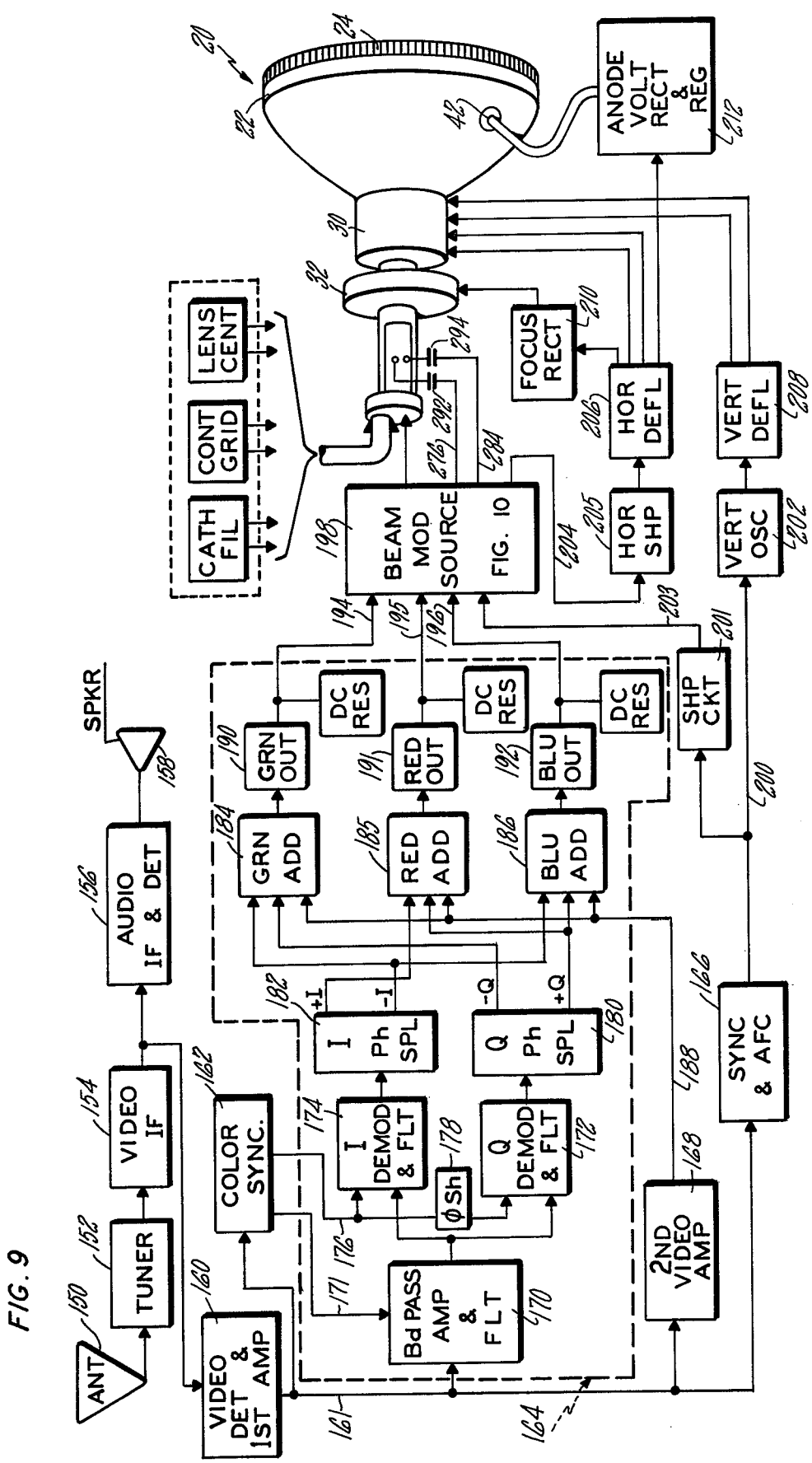
FIG. 9 is a schematic block diagram of an embodiment of the CRT of FIG. 1 as used in a color, television receiver.

Referring now to FIG. 9, in an embodiment of the CRT 20 of the present invention in a color television receiver, an antenna 150 provides the received video signals to a tuner 152, which has preset channel separation in accordance with FCC standards for television transmission. The tuner provides the video signal at the predetermined carrier frequency which includes the video, audio and synchronization signals, to a video IF strip 154. The video IF strip removes the carrier frequency and presents the video, FM audio and synchronization signals to the input of the audio IF and detection circuitry 156, which processes the audio signal component and provides the audio signal to a speaker 158, and to a video detector and first amplifier stage 160. The video detector removes the audio signal component and provides the combined video and timing synchronization signal information to: a color synchronization circuit 162, which includes the "color killer" circuitry (if required) and the "burst amplifier and detection circuitry"; to a chrominance decoding circuitry 164; to a synchronization and AFC circuit 166; and to the input of a second video amplifier stage 168. The chrominance circuitry 164 is shown as an I, Q type color decoding circuit known in the art, having a 0 to 1.5 megahertz bandwidth in the I channel and a 0 to 0.5 megahertz band-pass in the Q channel, and which provides excellent color reproduction. However, the chrominance decoder circuitry may similarly comprise the R-I and B-Y type system of chrominance decoding which is in common use in present commercial color receivers, wherein both channels have a 0 to 0.5 megahertz bandwidth and provide a reduced color frequency response. As may be known, the I-Q chrominance decoding circuitry includes a band-pass filter and filter network 170 which amplifies the video signal information on the line 161 and presents the amplified video through a two megahertz bandwidth filter (2.1 to 4.1 megahertz) to separate the portion of the overall video bandwidth of 4.0 megahertz containing the color sidebands, from that section of the signal containing only monochrome information (luminance signal component). The band-pass amplifier 170 receives a gate signal on a line 171 from the "color killer" circuitry which enables the band-pass amplifier in the presence of a color burst (a minimum eight cycle burst of 3.58 megahertz on the "back porch" of the horizontal blanking pulses). The output chrominance signal information is presented to the input of a Q color demodulator and filter 172 and to an I color demodulator and filter 174. The demodulators 172, 174 also receive, at a second input of each, the 3.58 megahertz signal on a line 176 from the receiver oscillator within the synchronization network 162, the signal presented to the Q demodulator being delayed by 90° through a phase shift network 178. The Q demodulator 172 provides the Q component signal to the input of a 0 to 0.5 megahertz low-pass filter and the I demodulator presents the I component to a 0 to 1.5 megahertz low-pass filter. The phase splitters 180, 182 provide plus and minus I and Q signals to the color matrix network, which include adder circuits 184 through 186 corresponding to the GREEN, RED and BLUE color signal information. Each of the adders receives the luminance signal information presented through a line 188 from the output of the second video amplifier 168, the GREEN adder 184 receiving in addition the $-Q$ signal and the $-I$ signal, the RED adder 185 receiving the $+I$ signal and the $+Q$ signal, and the BLUE adder 186 receiving the $-I$ and $+Q$ signals. The output signals from each of the adders are provided through output buffers 190 through 192 to the output lines 194 through 196. The analog voltage signal on each of these lines is representative of the intensity as the corresponding one of the three colors. In a three gun, shadow mask type of CRT known in the art, each of the lines 194 through 196 are presented to the control grid, or cathode, of a corresponding one of three electron gun assemblies. In FIG. 9, the lines are presented to three signal inputs of a beam modulator signal source 198, which is described in detail hereinafter with respect to FIG. 10.

The synchronization circuit 166 provides horizontal frequency sync pulses on a line 200 to the input of a signal shaping network 201, and to the input of a vertical sweep frequency oscillator 202. The signal shaping network 201 provides a symmetrical square wave at the horizontal sweep frequency of the received video signal, or external horizontal frequency $f_{HE}$, which is presented through a line 203 to another input of the beam modulator signal source 198. As described hereinafter, the beam modulator source provides an internal horizontal sweep frequency $(f_{HI})$ through a line 204 to the input of a horizontal deflection signal shaping network 205. The output sweep signals from the horizontal shaping circuit 205 and vertical oscillator 202 are presented to respective horizontal and vertical deflection circuits 206, 208 which provide the horizontal and vertical deflection sweep signals to the deflection yoke assembly 30 of the CRT 20. In addition, the horizontal deflection circuit 206 provides the horizontal deflection signal information to the input of a focus rectifier 210 and to the input of the CRT anode voltage rectifier and regulator circuit 212, the outputs of which are presented to the focus coil 32 and the anode voltage input terminal 42 of the CRT 20.

In the CRT 20 of the present invention, each of the phosphor groups $120_a$ through $_c$ of each of the plurality of picture elements 120 (FIG. 6) are excited on each horizontal line scan. Each of the concentric phosphor groups is excited with different average diameter values ($D_1$, $D_2$, $D_3$ of FIG. 8) of the hollow electron beam corresponding to beam sections 36a through 36c of FIG. 3. Therefore, the electron gun assembly 34 is modulated at a modulation frequency $(f_M)$ which exceeds the horizontal sweep frequency by a multiple equal to the number of picture elements in each horizontal line, or $f_M = N \cdot f_H$, where N is the number of picture elements per horizontal line. Each cycle of the modulation frequency modulates the electron beam through three sequential average beam diameters, each of determined value in dependence on the ID, OD of a corresponding one of the concentric phosphor rings, and each diameter value being maintained for a finite time interval to provide excitation of the corresponding phosphor. This requires signal modulation of the anode modulators 84, 86 of the electro-static beam modulator assembly 74 (FIGS. 7, 8), as described in the hereinbefore referenced copending application, through three discrete mode anode modulation signal values in each cycle of the modulation frequency $f_M$.

Figure 10:
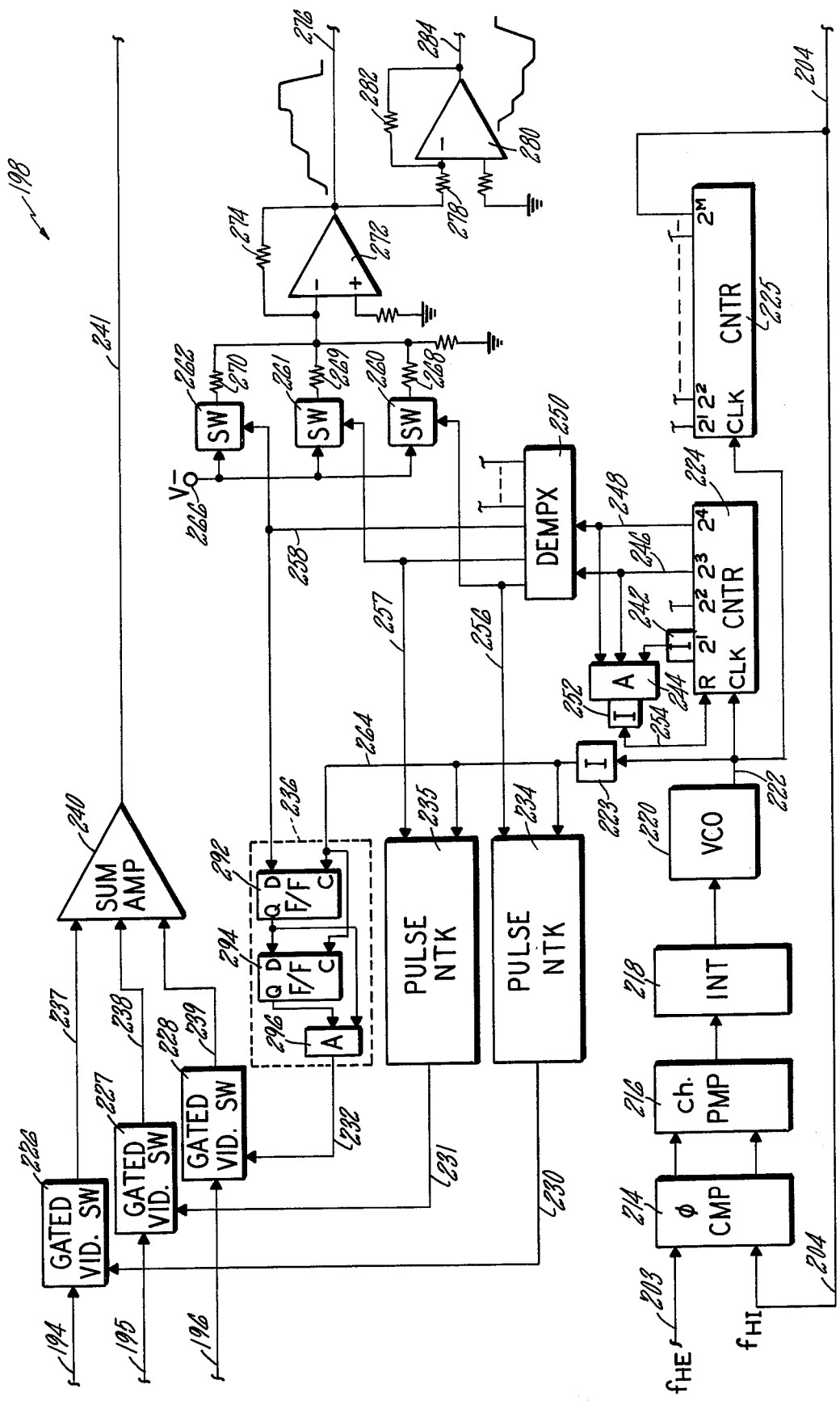
FIG. 10 is a schematic block diagram of a portion of the embodiment of FIG. 9.

If a given embodiment of the video screen formation 24 (FIG. 6) provides five hundred picture elements in each horizontal line (N = 500), a typical received horizontal raster frequency $(f_{HE})$ of 15.75 KHz results in a modulation signal frequency of 7.875 MHz. The electron gun anode modulators must be modulated to provide the three beam diameter values in each cycle requiring synchronized timing signals in excess of three times of the modulation frequency, or approximately 24.0 MHz. Since the highest signal frequency value within the received video signal is the "burst" frequency value of 3.85 MHz, an internal voltage controlled oscillator (VCO) provides a high frequency clock signal $(f_o)$ in excess of 24.0 MHz which is synchronized with the received video signal information through phase locked loop circuitry known in the art. The phase locked loop provides synchronization of the $f_o$ signal with the received video by counting down to $f_o$ signal to produce the internal horizontal frequency raster signal $(f_{HI})$ on the line 204, which is phase compared with the external synched signal $f_{HE}$. In the event of a phase difference between the two, a DC error signal, whose magnitude is proportional to the phase difference, is provided to the VCO which alters the phase of the $f_o$ signal in a direction to reduce the phase difference. Referring now to FIG. 10, the signal $f_{HE}$ on a line 203 is presented to one input of a phase comparator 214 comprising the first element in the phase locked loop, another input of which receives the signal $f_{HI}$ on the different line 204. The phase comparator provides a differential signal wave form having a phase and frequency in dependence on the difference phase between the two horizontal signals which is presented to a charge pump 216, which functions as a lowpass, or averaging filter for smoothing out the differential signal wave form to provide DC error signal with a magnitude in dependence on the phase and frequency of the signal. The DC output signal from the charge pump 216 is integrated in an integrator 218 and presented to a control input of a VCO 220. The VCO provides the signal frequency $f_o$ through a line 222 to the input of an invert gate 223, the input of a four bit counter 224, and to the input of an M bit counter 225. The counter 224 provides a count down of the $f_o$ frequency for use in providing the required gating signals for the electron gun assembly, while the counter 225 counts down the $f_o$ signal to provide the internal $f_{HI}$ signal required to close the phase locked loop. The counter 225 may comprise a plurality of counters connected in cascade to provide the required bit count, the value of which is dependent on the dynamic range, or difference frequency between $f_o$ and the horizontal sweep frequency $f_{HI}$. For the condition where $f_{HI} = f_o/2^M$, the $2^M$ bit output of the counter 225 is presented on the line 204 to the horizontal wave shaping network 205 (FIG. 9) and to the input of the phase comparator 214.

The chrominance color signals from the I-Q color demodulator 164 (FIG. 9) are presented through the lines 194 through 196 to the input of a respective one of a plurality of gates video switches 226 through 228, of a type known in the art, which conduct an input signal to an output line in response to a gate signal at a gate input thereof. The switches are gated on sequentially by periodic, time sequenced gate signals presented on a plurality of lines 230 through 232 from pulse networks 234 through 236 to provide sequential conductance of the corresponding signal on the lines 194 through 196 to output lines 237 through 239. The lines 237 through 239 are presented to the input of a summing amplifier 240, which in combination with the gated video switches provide multiplexing of the individual chrominance color signals on the lines 194 through 196 into a series plurality of video signal envelopes, each envelope having an instantaneous magnitude equal to that of the corresponding one of the three color signals within the respective multiplexing time interval. The series signals are presented through a line 241 to the cathode assembly 44 of the electron gun assembly (FIGS. 7, 8). As stated hereinbefore, the sequential gating of the switches 226 through 228 is periodic, and one sample of each chrominance color signal is provided in each period. As described hereinafter, the multiplex signal on the line 241 modulates the current density of the electron beam during the simultaneous, synchronized modulation of the electron beam diameter.

The gating signals for the video switches 226 through 228 and the modulation signals for the anode modulator rings of the electron gun assembly, are provided by counting down and decoding the $f_o$ clock signal on the line 222. The counter 224 counts down the $f_o$ signal to provide subharmonics at binary multiples of $2^1$, $2^2$, $2^3$ and $2^4$. The $2^1$ bit count is inverted through an invert gate 242 and presented to one input of an AND gate 244. The $2^3$ and $2^4$ signal counts are presented through lines 246, 248 to second and third inputs of the AND gate 250 and to the signal input of a de-multilexer 250. The output signal from the AND gate 244 is inverted by an invert gate 252 and presented through a line 254 to the RESET input of the counter 224. The AND gate 224 and invert gates 242, 252 decode the three bit counts to provide a reset of the counter 224 at the end of every thirteen clock periods of the $f_o$ signal. The demultiplexer 250 decodes the four binary states of the two bit input signal provided by the $2^3$ and $2^4$ bit counts on the lines 246, 248, to provide individual periodic gate signals corresponding to ech of the four binary states. The first three de-multiplexed gate signals are presented through lines 256 through 258 to an input of a corresponding one of the pulse networks 234 through 236 and to a gate input of a corresponding one of a plurality of gated switches 260 through 262. Each pulse network also receives at a second input thereof, the inverted $f_o$ signal on a line 264 from the invert gate 223. All of the gated switches 260 through 262 are connected on one side to a negative voltage source 266, and each is connected on the other side through a corresponding one of a plurality of resistors 268 through 270 to the inverting input of an operational amplifier (op amp) 272. The amplifier 272 is operated closed loop with a feedback resistor 274, and the ratio of the magnitude of the resistor 274 to each of the input resistors 268 through 270 determines the signal gain provided through the corresponding one of the input paths. The switches 260 through 262 are gated sequentially and the input resistors 268 through 270 are of different resistance values to provide three discrete signal gains and three discrete output signal magnitudes, one for each of the gate signals on the lines 256 through 258. The signal output from the amplifier 272 is provided on a line 276 to the output of the beam modulator signal source and through a resistor 278 to the inverting input of a second op amp 280. The op amp 280 is provided with a feedback resistor 282 which establishes a closed loop signal gain approximately equal to unity, such that the output signal from the amplifier 280 is essentially complementary to the output signal from the amplifier 272, and is presented through a line 284 to a second output of the beam modulator source.

Referring now to FIG. 11, illustration (a), in the operation of the modulator source 198 a received video signal at the output of the video detector 160 (FIG. 9) includes horizontal blanking pulses 285 with superimposed sync pulses 286. The video signal information 288 between blanking pulses includes both the luminance video and the quadrature components (I, Q) of the chrominance video information. The high frequency signal $f_o$ (illustration (b)) is synchronized with the sync pulses 286 through the phase locked loop. In an expanded time base illustration of a portion of the horizontal line video signal 288 as shown in illustration (c), the chrominance signal components on the lines 194 through 196 are substantially constant over a small time increment. The expanded time base signal $f_o$ (illustration (d)) is counted down by the counter 224, and the inverted $2^1$ count (illustration (e)) and the $2^3$, $2^4$ counts (illustrations (f), (g)) are decoded by the AND gate 244 to provide a RESET signal (illustration (h)) on the line 254 to the RESET input of the counter 224 at the end of each twelve cycles of the $f_o$ signal, such that the counter 224 resets on the thirteenth clock count. The de-multiplexer 250 provides the sequenced gate signals on the lines 256 through 258 (illustrations (i) through (k)) in response to the first three of four binary states provided by the $2^3$, $2^4$ bit counts between each RESET interval. The three gate signals are sequential and are followed by an interim delay period provided by the RESET interval which corresponds in time to the step of the electron beam across the high work function material 126 between adjacent picture elements.

The signals on the lines 256 through 258 sequentially gate on the switches 260 through 262 providing three discrete output voltage signal magnitude levels on the line 276 in response thereto. The output signal response of the amplifier 272 is shown generally in illustration (o) by the three levels $VD_1$, $VD_2$ and $VD_3$, corresponding to three discrete average diameter values of the electron beam, followed by a zero amplitude interval 290 during which the electron beam traverses the intermediate high work function material between adjacent picture elements. The duration of each of the discrete voltage values $VD_1$ through $VD_3$ is substantially equal to the pulse width of each of the gate signals from the de-multiplexer 250.

The gate signals on the lines 256 through 258 are presented concurrently to the pulse networks 234 through 236 which provide in response a synchronized, shortened pulse width gte signal on the lines 230 through 232. The pulse networks are of a type known in the art, each identical to the pulse network 236 of FIG. 10, and each including a pair of bistable devices 292, 294, such as D edge triggered flip-flop, which receive the inverted clock count ($\overline{f_o}$) at a clock input thereof. The bistable 292 receives the gate signal on the line 258 (FIG. 11, illustration (i)), which is clocked through a leading edge of the inverted clock signal. The Q output from the bistable 292 is presented to the D input of the bistable 294 and is clocked through the bistable on the next succeeding clock pulse. The Q signal outputs from both bistables 292, 294 are presented to an AND gate 296 which provides the delayed gate wave form of FIG. 11, illustration (n), the pulse networks 234, 236 providing the output pulses shown in illustrations (l) and (m) respectively. The delayed, shortened pulse width, time sequenced gate signals provided by the pulse networks 234 through 236 ensure that the video signal information provided through the gated switches 226 through 228 is not presented to the cathod 44 of the electron gun assembly 34 (FIGS. 7, 8) until the electron gun has responded to the corresponding beam diameter modulation signal (FIG. 11, illustration (o)) to provide the change in the electron beam average diameter and the registration of the electron beam with the geometry of the corresponding concentric, color phosphors of the picture element. This prevents color impurity resulting from the smearing or "clipping" of the contiguous phosphor colors during the transition of the electron beam from one average diameter value to another.

Referring again to FIG. 9, the voltage signals on the lines 276, 284 are presented through capacitors 292, 294 to the input terminals 38, 40 of the anode modulator rings 84, 86 (FIGS. 7, 8). As described in detail in the hereinbefore referenced, copending application, the modulation signals alter the electrostatic field of the anode and modulators in dependence of the modulation signal magnitude, and in a complementary manner to provide the change in the electron beam average diameter. The relationship between the beam diameter value and the modulation signal magnitude ($V_D$) is essentially linear and the modulation signals provided to each of the anode modulators is substantially complementary, although some allowance in the magnitude of the signal presented to the second anode modulator 86 is required to account for the difference in radial position of the electron beam in traversing the two anodes.

As stated hereinbefore, the mask-less, single electron gun, color CRT of the present invention provides a color CRT capable of providing high fidelity video color reproduction at a brilliance for in excess of that provided by a prior art color CRT at the same operating energy levels, or conversely, to provide video brilliance comparable to that of a prior art CRT at reduced, energy saving levels. Elimination of the post deflection aparatus, such as the high precision shadow mask required in a triad color CRT, provides for ease of fabrication and possible reduction in CRT cost.

By reducing the power requirements in a commercial color receiver while maintaining video brilliance levels comparable to that available in prior art CRT's, the color CRT of the present invention provides both a reduction in required energy consumption, and a reduction in health hazards due to x-ray emission. Video brilliance is provided at the reduced power levels by allowing utilization of the full beam current emitted by the gun assembly. Enhanced color fidelity is provided by adjusting the geometry of the concentric phosphors to alter the phosphor surface area in dependence on its proton efficiency characteristic without limitation the aperture geometry of a shadow mask or grid assembly. In addition, the use of a hollow electron beam not only reduced power consumption of the beam, but also allows the beam to more accurately maintain its shape due to reduced coulomb repulsion within the beam. Similarly, although the invention has been shown and described with respect to illustrative embodiments thereof, it should be understood by those skilled in the art that the foregoing and various other changes, omissions and additions in the form and detail thereof may be made therein without departing from the spirit and scope of this invention.

Having thus described typical embodiments of my invention, that which I claim as new and desire to secure by Letters Patent is:

1. A color cathode ray tube (CRT) for providing a color video display in response to video signals, horizontal and vertical deflection signals, anode voltage signals, electron beam focusing signals, and electron beam modulation signals, presented from a system having s source of video signals, a source of horizontal and vertical deflection signals, a source of anode voltage signals, a source of electron beam focusing signals, and a source of electron beam modulation signals, comprising:

a vacuum envelope having a hollow funnel portion with a large diameter flared end enclosed in a vacuum sealing relationship by a faceplate portion and a small diameter tapered end disposed in a vacuum sealing relationship with a hollow neck portion extending rearward from said funnel portion along a central longitudinal axis thereof, said faceplate portion having a transparent major surface;

electron gun means, disposed inside said neck portion along said longitudinal axis and connected for response to the source of video signals, the source of anode voltage signals, and the source of beam modulation signals, for providing a hallow electron beam having a determined instantaneous inner and outer diameter in dependence on the magnitude of the beam modulation signals and having a beam axis coincident with said longitudinal axis, said electron gun means providing said hollow electron beam at an emitted current density in dependence on the magnitude of the video signal;

electron beam deflection means, disposed on the outside surface perimeter of said vacuum envelope at the junction of said neck and funnel portions and connected for response to the source of horizontal and vertical deflection signals, for providing deflection of the electron beam across said transparent major surface in each of two orthogonal directions in response to the deflection signals; and a video screen formation, disposed inside said vacuum glass envelope on said transparent major surface, said video screen formation including a plurality of noncontiguous picture elements disposed substantially in a matrix configuration of rows and columns, each of said picture elements having a determined surface area boundary and each including a plurality of different color phosphors disposed in a determined concentric pattern within the determined surface area boundary, said video screen formation further including a high work function dielectric material disposed interposingly with said plurality of picture elements on said transparent major surface for providing in response to bombarding electrons from the incident hollow electron beam, an electrostatic field which is negative with respect to the anode voltage signal and which has a gradient in a direction opposed to the trajectory of the incident electron beam, said negative electrostatic field providing in combination with said beam deflection means, registration of the incident electron beam on each of said picture element successively, for a determined time period, and stepping of the incident electron beam from the center of one picture element to the center of a next adjacent picture element in each row at the end of the determined time period.

2. The color CRT of claim 1 wherein the concentric pattern of different color phosphors of each of said picture elements comprises, a first color phosphor deposited in a solid central portion of determined diameter, a second color phosphor deposited in a first ring circumscribing said central portion, said first ring having an inner diameter substantially equal to the diameter of said central portion and having a determined outer diameter, and a third color phosphor deposited in a second ring circumscribing said first ring and said central portion, said second ring having an inner diameter substantially equal to the outer diameter of said first ring and having an outer circumference in register with the determined surface area boundary of said picture element.

3. The color CRT of claim 2, wherein each of said plurality of picture elements further comprises an aluminum coating suitably disposed across the entire surface area of each of said picture elements coextensive with the determined surface area boundary, said aluminum coating having a determined thickness for allowing penetration through said coating by the electrons of the incident hollow electron beam, said aluminum coating on each of siad picture elements being electrically connected for response to the source of the anode voltage signal.

4. The color CRT of claim 3, wherein said electron gun means provides, in response to the magnitude of sequential beam modulation signals, sequential modulation of the instantaneous inner and outer diameters of the hollow electron beam concurrent with the registration of the electron beam on each of said picture elements for the determined time period, the sequential modulation providing sequential instantaneous inner and outer beam diameter values, each for a determined time interval within the time period of registration of the electron beam on each of siad picture elements, and each in correspondence with the diameter values of a respective one of the concentric color phosphors of each of said picture elements.

5. The color CRT of claim 4, further comprising:
electron beam focusing means, connected for response to the source of focusing signals and disposed on the outside surface perimeter of said neck portion along siad longitudinal axis intermediate said electron gun means and said electron beam deflection means, for providing focusing of the emitted electron beam in response to the magnitude of the focusing signals.

6. A color cathode ray tube (CRT) for providing a color video display in response to video signals, horizontal and vertical deflection signals, first and second anode voltage signals, electron beam focusing signals, bias voltage signals, and electron beam modulation signals, presented from a system having a source of video signals, a source of horizontal and vertical deflection signals, a source of first anode voltage signals, a source of second anode voltage signals, a source of electron beam focusing signals, a source of bias voltage signals, and a source of electron beam modulation signals, comprising:
a vacuum envelope having a hollow funnel portion including a wall structure with a large diameter flared end enclosed in a vacuum sealing relationship by a faceplate portion and a small diameter tapered end disposed in a vacuum sealing relationship with a hollow neck portion extending rearward from said funnel portion along a central longitudinal axis thereof, said faceplate portion having a transparent major surface;

electron gun means, disposed inside said neck portion along said longitudinal axis and connected for response to the source of video signals, the source of first anode voltage signals, and the source of beam modulation signals, for providing a hollow electron beam having a determined instantaneous inner and outer diameter in dependence on the magnitude of the beam modulation signals and having a beam axis coincident with said longitudinal axis, said electron gun means providing said hollow electron beam at an emitted current density in dependence on the magnitude of the video signal;

electron beam deflection means, connected for response to the source of horizontal and vertical deflection signals and disposed on the outside surface perimeter of said vacuum envelope at the junction of said neck and funnel portions, for providing deflection of the electron beam across said transparent major surface in each of two orthogonal directions in response to the deflection signals;

a video screen formation, disposed inside said vacuum glass envelope on said transparent major surface, said video screen formation including a plurality of noncontiguous picture elements disposed substantially in a matrix configuration of rows and columns, each of said picture elements having a determined surface area boundary and each including a plurality of different color phosphors disposed in a determined concentric pattern within the determined surface area boundary, said video screen formation further including a high work function dielectric material disposed interposingly with said plurality of picture elements on said transparent major surface for providing, in response to impinging electrons from the incident hollow electron beam, an electrostatic field which is negative with respect to the first anode voltage signals and which has a gradient in a direction opposed to the trajectory of the incident electron beam, said negative electrostatic field providing in combination with said beam deflection means, registration of the incident hollow electron beam on each of said picture element successively, for a determined time period, and stepping of the incident electron beam from the center of one picture element to the center of a next adjacent picture element in each row at the end of the determined time period; and flood gun means, suitably disposed through the wall structure of said funnel portion in a vacuum sealing relationship and connected for response to the source of bias voltage signals and the source of second anode voltage signals, for presenting a continuous electron emission to said video screen formation, said electron emission impinging the video screen formation in the form of an electron spary with an incident surface area coextensive with said transparent major surface, said continuous electron emission providing continuous electron bombardment of said high work function dielectric material.

7. The color CRT of claim 6 wherein the concentric pattern of different color phosphors of each of said picture elements comprises, a first color phosphor deposited in a solid central portion of determined diameter, a second color phosphor deposited in a first ring circumscribing said central portion, said first ring having an inner diameter substantially equal to the diameter of said central portion and having a determined outer diameter, and a thrid color phosphor deposited in a second ring circumscribing said first ring and said central portion, said second ring having an inner diameter substantially equal to the outer diameter of said first ring and having an outer circumference in register with the determined surface area boundary of said picture element.

8. The color CRT of claim 7, wherein each of said plurality of picture elements further comprises an aluminum coating suitably disposed across the entire surface area of each of said picture elements coextensive with the determined surface area boundary, said aluminum coating having a determined thickness for allowing penetration through said coating by the electrons of the incident hollow electron beam, said aluminum coating on each of said picture elements being electrically connected for response to the source of first anode voltage signals.

9. The color CRT of claim 8 wherein said flood gun means comprises:
 cathode emitter means, responsive to the source of bias voltage signals, for providing said continuous electron emission at a determined current density in dependence on the magnitude of the bias voltage signals;
 accelerating anode means, disposed coaxially with said cathode emitter means and connected for response to the source of second anode voltage signals, for providing a determined acceleration of said electron emission in dependence on the magnitude of the second anode voltage signal; and wherein,
 the determined current density and acceleration of said electron emission provides a determined beam energy less than that required for electron penetration of said aluminum coating on each of said picture elements.

10. The color CRT of claim 9, wherein said electron gun means provides, in response to the magnitude of sequential beam modulation signals, sequential modulation of the instantaneous inner and outer diameters of the hollow electron beam concurrent with the registration of the electron beam on each of said picture elements for the determined time period, the sequential modulation providing sequential instantaneous inner and outer beam diameter values, each for a determined time interval within the time period of registration of the electron beam on each of said picture elements, and each in correspondence with the diameter values of a respective one of the concentric color phosphors of each of said picture elements.

11. The color CRT of claim 10, further comprising:
 electron beam focusing means, connected for response to the source of focusing signals and disposed on the outside surface perimeter of said neck portion along said longitudinal axis intermediate said electron gun means and said electron beam deflection means, for providing focusing of the emitted electron beam in response to the magnitude of the focusing signals.

12. A mask-less color cathode ray tube (CRT) for providing a color video display in a system having a source of video signals, a source of horizontal and vertical deflection signals, a source of anode voltage signals, and a source of electron beam modulation signals, comprising:

a vacuum envelope having a hollow portion extending along a central longitudinal axis thereof, and including a transparent major surface;
 electron gun means, disposed inside said vacuum envelope along said longitudinal axis and connected for response to the source of beam modulation signals, for providing, to said transparent major surface, a hollow electron beam having inner and outer diameter values in dependence on the magnitude of the beam modulation signals presented thereto, and having a minimum beam energy level;
 electron beam deflection means, disposed outside said vacuum envelope and connected for response to the source of horizontal and vertical deflection signals, for providing deflection of the electron beam across said transparent major surface; and
 a video screen formation, including a plurality of noncontiguous picture elements disposed on said transparent major surface, each having a surface area boundary and each including color phosphors disposed in a concentric pattern within said surface area boundary, said video screen formation further including a high work function dielectric material disposed on said transparent major surface interposingly with said plurality of picture elements, said high work function dielectric material providing an electrostatic field in response to said hollow electron beam incident on the surface thereof, said electrostatic field having a potential gradient in a direction opposed to the trajectory of the incident electron beam, said electrostatic field repelling the incident electron beam from the surface of said dielectric material, thereby providing registration of the incident electron beam on said picture elements.

13. The mask-less CRT of claim 12, wherein said video screen formation further includes an aluminum coating disposed across the surface area of each of said picture elements coextensive with the surface area boundary thereof, said aluminum coating having a coating thickness in dependence on said minimum beam energy level to allow penetration therethrough of the electrons of said hollow electron beam incident on said picture elements, said aluminum coating on each of said picture elements being electrically connected to the source of the anode voltage signals.

14. The mask-less color CRT of claim 12, wherein said electron gun means is further connected for response to the source of video signals for providing said hollow electron beam at a current density in dependence on the magnitude of the video signals presented thereto.

15. The mask-less color CRT of claim 12, wherein said high work function dielectric material is boron nitride.

16. The mask-less color CRT of claim 13, wherein said concentric pattern of color phosphors in each of said picture elements comprise:
 a first color phosphor disposed in a solid central portion having an outer boundary;
 a second color phosphor disposed in a first ring circumscribing said central portion, said first ring having an inner boundary contiguous with said central portion outer boundary and having an outer boundary; and
 a third color phosphor deposited in a second ring circumscribing said first ring, said second ring having an inner boundary contiguous with said first ring outer boundary and having an outer boundary in register with the surface area boundary of said picture element.

17. A mask-less color cathode ray tube (CRT) for providing a color video display in a system having a source of video signals, a source of horizontal and vertical deflection signals, a source of first anode voltage signals, a source of second anode voltage signals, a source of bias voltage signals, and a source of electron beam modulation signals, comprising:

a vacuum envelope having a hollow portion extending along a central longitudinal axis thereof, and including a transparent major surface;

electron gun means, disposed inside said vacuum envelope along said longitudinal axis and connected for response to the source of beam modulation signals, for providing, to said transparent major surface, a hollow electron beam having inner and outer diameter values in dependence on the magnitude of the beam modulation signals presented thereto, and having a minimum beam energy level;

electron beam deflection means, disposed outside said vacuum envelope and connected for response to the source of horizontal and vertical deflection signals, for providing deflection of the electron beam across said transparent major surface;

flood gun means, suitable disposed inside said vacuum envelope, and connected to the source of bias voltage signals and the source of second anode voltage signals to provide a continuous electron emission to said transparent major surface, said electron emission having an energy level less than said minimum beam energy level; and a video screen formation, including a plurality of noncontinguous picture elements disposed on said transparent major surface, each having a surface area boundary and each including color phosphors disposed in a concentric pattern within said surface area boundary, said video screen function further including a high work function dielectric material disposed on said transparent major surface interposingly with said plurality of picture elements, said picture elements and said high work function dielectric material each receiving said hollow electron beam and said electron emission presented to said transparent major surface, said high work function dielectric material providing an electrostatic field in response to electrons incident on the surface thereof, said electrostatic field having a potential gradient in a direction opposed to the trajectory of the hollow electron beam presented to said transparent major surface, said electrostatic field repelling the hollow electron beam from the surface of said dielectric material, thereby providing registration of the incident electron beam on said picture elements.

18. The mask-less color CRT of claim 17, wherein said video screen formation further includes an aluminum coating disposed across the surface area of each of said picture elements coextensive with the surface area boundary thereof, said aluminum coating having a coating thickness in dependence on said minimum beam energy level to provide penetration therethrough of the electrons of said hollow electron beam incident on said picture elements and not to provide penetration therethrough of the electrons in said electron emission, said aluminum coating on each of said picture elements being electrically connected to the source of the first anode voltage signals.

19. The mask-less color CRT of claim 18, wherein said flood gun means comprises:

cathod emitter means, responsive to the source of bias voltage signals, for providing said continuous electron emission at a selected current density in dependence on the magnitude of the bias voltage signals;

accelerating anode means, disposed coaxially with said cathode emitter means and connected for response to the source of second anode voltage signals, for providing a selected acceleration of said electron emission in dependence on the magnitude of the second anode voltage signal and wherein, the selected current density and acceleration of said electron emission provides an electron emission at an energy level less than that required for electron penetration through said aluminum coating on each of said picture elements.

* * * * *

UNITED STATES PATENT AND TRADEMARK OFFICE
CERTIFICATE OF CORRECTION

PATENT NO. : 4,095,144
DATED : June 13, 1978
INVENTOR(S) : Charles Mendelsohn

It is certified that error appears in the above-identified patent and that said Letters Patent are hereby corrected as shown below:

Column 2, line 4, "horizonatla" should be --horizontal--.

Column 4, line 9, "diamter" should be --diameter--.

Column 4, line 32, "gird" should be --grid--.

Column 5, line 27, "elemnts" should be --elements--.

Column 6, line 26, "2000A" should be --2000Å--.

Column 6, line 43, "2000A" should be --2000Å--.

Column 7, line 31, "scucessively" should be --successively--.

Column 7, line 32, "elemtn" should be --element--.

Column 7, line 33, "picutre" should be --picture--.

Column 7, line 50, "2000" should be --2000Å--.

Column 8, line 22, "cause" should be --causes--.

Column 10, lines 3 and 4, "interium" should be --interim--.

Column 11, line 68, delete "mode".

Column 12, line 32, delete "different".

Column 12, line 38, after "provide" insert --a--.

Column 12, line 62, change "gates" to --gated--.

UNITED STATES PATENT AND TRADEMARK OFFICE
CERTIFICATE OF CORRECTION

PATENT NO. : 4,095,144
DATED : June 13, 1978
INVENTOR(S) : Charles Mendelsohn

It is certified that error appears in the above-identified patent and that said Letters Patent are hereby corrected as shown below:

Column 13, line 12, after "assembly" insert --34--.

Column 13, line 30, change "de-multilexer" to --de-multiplexer--.

Column 13, line 30, change "gate 250" to --gate 244--.

Column 13, line 34, change "224" to --244--.

Column 13, line 40, change "ech" to --each--.

Column 14, line 52, change "gte" to --gate--.

Column 15, line 4, change "cathod" to --cathode--.

Column 15, line 41, change "aparatus" to --apparatus--.

Column 15, line 55, change "proton" to --photon--.

Column 15, line 55, after "limitation" insert --by--.

Column 15, line 58, change "reduced" to --reduces--.

Column 16, line 9, change "s" to --a--.

Column 17, line 24, change "siad" to --said--.

Column 17, line 37, change "siad" to --said--.

Column 17, line 45, change "siad" to --said--.

Column 18, line 58, change "spary" to --spray--.

UNITED STATES PATENT AND TRADEMARK OFFICE
CERTIFICATE OF CORRECTION

PATENT NO. : 4,095,144

DATED : June 13, 1978

INVENTOR(S) : Charles Mendelsohn

It is certified that error appears in the above-identified patent and that said Letters Patent are hereby corrected as shown below:

Column 19, line 3, change "thrid" to --third--.

Column 21, line 29, change "suitable" to --suitably--.

Column 21, line 41, change "function" to --formation--.

Column 22, line 29, change "cathod" to --cathode--.

Signed and Sealed this

Fifth Day of June 1979

[SEAL]

Attest:

RUTH C. MASON
Attesting Officer

DONALD W. BANNER
Commissioner of Patents and Trademarks